Patented June 29, 1937

2,085,165

UNITED STATES PATENT OFFICE 2,085,165

TITANIUM PIGMENTS

Reginald Hill Monk, Rosemere, Quebec, Canada, assignor to American Zinc, Lead and Smelting Company, St. Louis, Mo., a corporation of Maine No Drawing. Application December 21, 1933, Serial No. 703,490

3 Claims. (Cl. 134—78)

This invention relates to titanium pigments and particularly to such pigments as contain zinc and titanium in the titanate form and to a process of producing such pigments.

While pigments comprising various titanates have been heretofore proposed, the present invention has for its object the production of an improved pigment, having high opacity and wearing properties when employed in paints for outdoor purposes, which is inert to acid vehicles and in the preparation of which the reaction between the zinc oxide and titanium oxide is so controlled as to ensure substantial completeness of the reaction, leaving little, if any, of the zinc oxide in the pigment in the uncombined state.

The oxide of titanium is prepared from a sulphate solution which has been made from the ore or concentrate in the usual known way which consists in the adjustment of the sulphuric acid employed for the solution of the ilmenite or titaniferous sands, that is, the acid concentration should be adjusted to meet the requirements fixed by the solubility of the ore used. When, for instance, ilmenite is the source of the titanium, acid of ordinary commercial strength may be advantageously used, but in the case of titaniferous sands the percentage of rutile contained determines the concentration of $SO_4$ in the solvent employed. This $SO_4$ concentration may be secured by utilization of high percentage acid alone or by addition to commercial acid of a bisulphate of an alkaline earth metal. The sulphated mass obtained from this reaction is dissolved in water at a temperature not higher than 60 to 70° C. so that a solution containing about 200 grams per litre of combined $TiO_2$ is obtained for purposes of hydrolysis.

This solution, containing about 200 grams per litre of $TiO_2$, (as sulphate) is added to a suspension of a reagent in water at about 80° C. to provide nuclei about which the hydrolyzed oxide may precipitate. For this purpose may be used silica gel or a suspension of hydrous zinc oxide equivalent in either case to about 1 or 2% of the $TiO_2$ present in the solution. The precipitated $TiO_2$ is washed and sufficient zinc or magnesium oxide is added to convert the adsorbed sulphate ions into zinc or magnesium sulphate. This soluble sulphate is then removed by washing and recovered for further uses.

To convert the pure oxide of titanium into the titanate of zinc it is important that there should be present a small percentage of colloidal zinc oxide or colloidal titanium oxide in order that a rapid and complete reaction may occur at a sufficiently low temperature to produce a satisfactory pigment.

If the chloride of the combining substance dissociates at the calcining temperature (about 825–900° C.) then this salt will provide the colloidal particle for the start of the reaction. In the case of the titanate of zinc, as the chloride of zinc boils off without dissociation the function of the salt must be supplied by some other means. Therefore, there is employed either a colloidal $TiO_2$ formed by the addition of hydrochloric acid or nitric acid to the washed pulp or a hydrous zinc oxide prepared in some well-known manner and added to the titanium dioxide and zinc oxide which are mixed together in their correct proportion (approx. 82 parts ZnO and 80 parts $TiO_2$) to form a zinc titanate.

Sometimes a combination of the two methods is desirable, the essential point being that a complete conversion should take place. In any event the product should contain less than 5% uncombined zinc oxide.

The titanate so produced is superior to any mixture of zinc oxide and titanium oxide while it retains the useful and desirable qualities of such a mixture. It does not thicken in the usual vehicles and does not chalk or disintegrate upon exposure to the atmosphere when used as a paint in suitable vehicles.

What I claim is:

1. A method of producing a titanium pigment which comprises adding to hydrous zinc oxide in suspension a sulphate solution of titanium oxide, bringing the solution to a temperature of about 80° C., washing the hydrolyzed $TiO_2$, neutralizing the adsorbed $SO_3$ with magnesium oxide, removing the magnesium sulphate so formed, adding to the pulp with stirring a small percentage of an acid capable of forming colloidal $TiO_2$ to act as a catalyst in the subsequent reaction, mixing with molecular proportions of zinc oxide and calcining the mass to produce zinc titanate.

2. A method of producing a titanium pigment which comprises adding to hydrous zinc oxide in suspension a sulphate solution of titanium oxide, bringing the solution to a temperature of about 80° C., washing the hydrolyzed $TiO_2$, neutralizing the adsorbed $SO_3$ with zinc oxide, removing the zinc sulphate so formed, adding hydrous zinc oxide to the pulp with stirring, mixing with molecular proportions of zinc oxide and calcining the mass to produce zinc titanate.

3. A method of producing a titanium pigment which comprises adding to hydrous zinc oxide in suspension a sulphate solution of titanium oxide, bringing the solution to a temperature of about 80° C., washing the hydrolyzed $TiO_2$, neutralizing the adsorbed $SO_3$ with zinc oxide, removing the zinc sulphate so formed, adding to the pulp with stirring a small percentage of an acid capable of forming colloidal $TiO_2$ to act as a catalyst in the subsequent reaction, mixing with molecular proportions of zinc oxide and calcining the mass to produce zinc titanate.

REGINALD HILL MONK.